July 15, 1941.     R. H. MORSE, JR     2,249,573
ENGINE INDICATOR
Filed Aug. 8, 1938     3 Sheets-Sheet 1

INVENTOR.
ROBERT H. MORSE JR.
BY
Roy M. Eilers
ATTORNEY.

July 15, 1941.   R. H. MORSE, JR   2,249,573
ENGINE INDICATOR
Filed Aug. 8, 1938   3 Sheets-Sheet 2
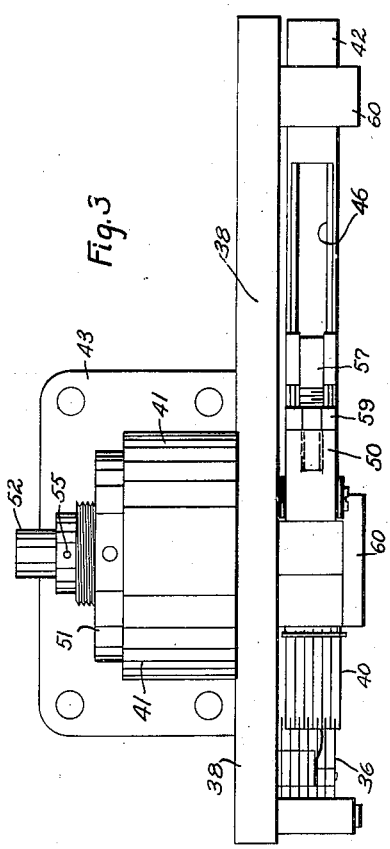
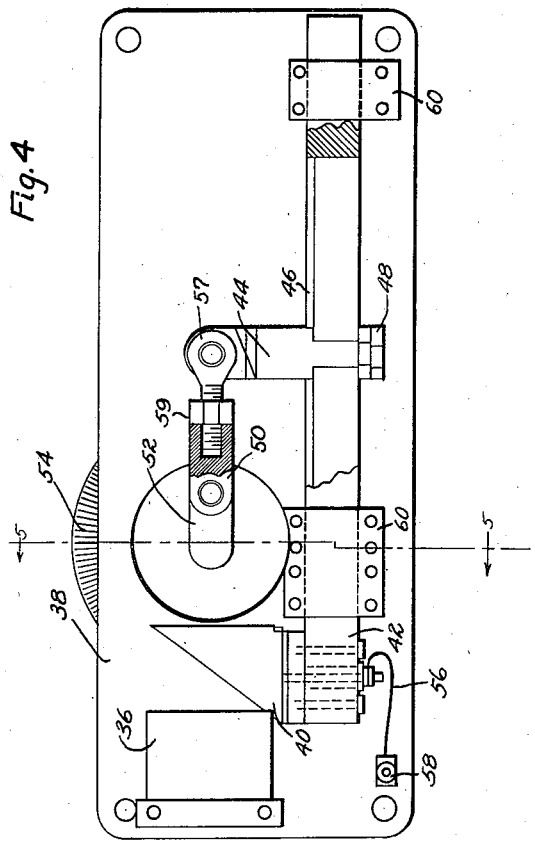
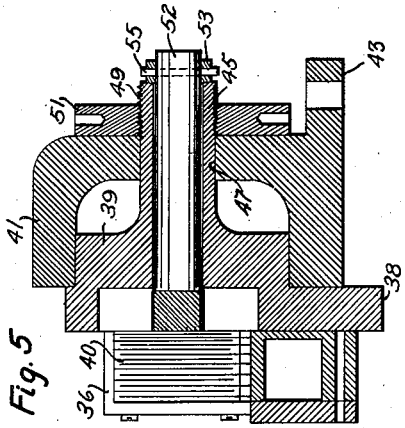
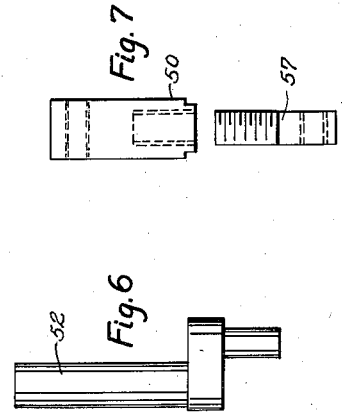
INVENTOR.
ROBERT H. MORSE JR.
BY
Roy M. Eilers
ATTORNEY.

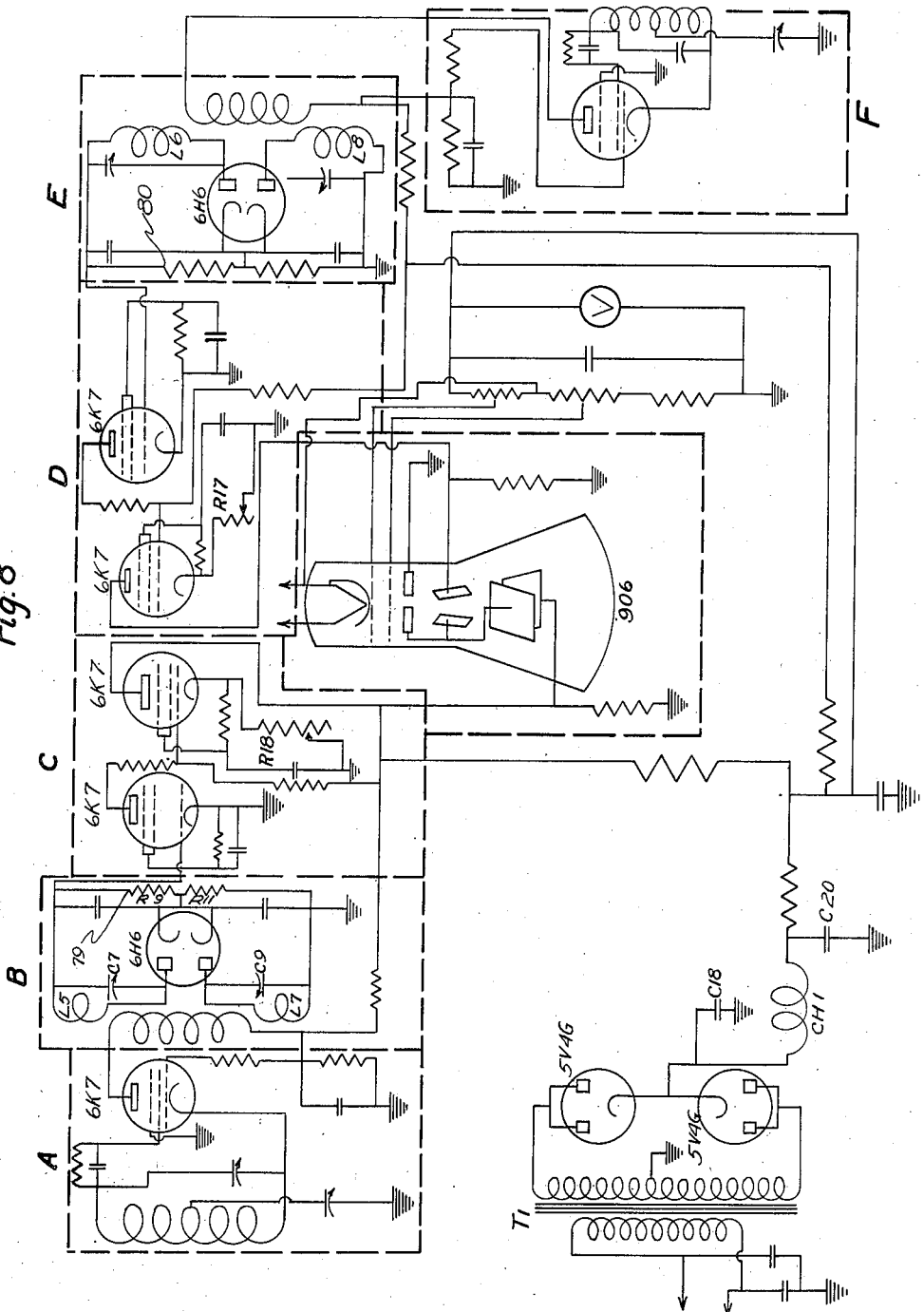

Patented July 15, 1941

2,249,573

UNITED STATES PATENT OFFICE 2,249,573

ENGINE INDICATOR

Robert H. Morse, Jr., Chicago, Ill.

Application August 8, 1938, Serial No. 223,582

7 Claims. (Cl. 73—30)

This invention relates to a device for showing, indicating, or recording the events within the cylinder of an engine.

There are many types of devices for indicating and recording various conditions of pressure within an engine cylinder in relation to the position of the piston. Nearly all of these devices, however, use various levers and straight line motion mechanisms which prevent their use on high speed engines.

It is an object of this invention to provide an improved indicator for engine cylinders.

It is also an object of this invention to provide an indicator which will not be subject to speed limitations or to the limitations imposed by sliding contacts. Further objects and advantages will appear in the detailed description of one form of my invention, the accompanying drawings, and the claims.

The device of my invention may consist of the following units: A pressure modulator, a crank modulator, an oscillator for the pressure modulator, and an oscillator for the crank modulator, two discriminatory rectifiers, two voltage amplifiers, and an oscilloscope. The device is so arranged that the pressure modulator varies the frequency of its oscillator in proportion to the pressure in the cylinder while the crank modulator varies the frequency of its oscillator in accordance with the position of the piston. Each oscillator feeds a discriminatory rectifier which rectifies the output of the oscillator and passes it to a ballast resistor. The voltage across the ballast resistor will vary in accordance with the frequency of the oscillators in a manner yet to be described. This small varying voltage may be amplified and fed to the plates of a cathode ray oscilloscope. The amplified output of the oscillator controlled by the crank modulator may feed the horizontal plates of the oscilloscope while the amplified output of the oscillator controlled by the pressure modulator may control the vertical plates of the oscilloscope. The resulting figure on the screen of the oscilloscope will be the true indicator diagram of the cylinder under investigation.

Fig. 3 is a top plan view of one form of crank modulator provided by my invention.

Fig. 4 is a side view of the crank modulator shown in Fig. 3.

Fig. 5 is a cross-sectional view taken along line 5—5 of Fig. 4.

Fig. 6 is a crankshaft detail.

Fig. 7 is a connecting rod detail.

Fig. 8 is a schematic circuit diagram of an indicator embodying my invention.

For the purpose of illustration, I will now describe one form of my invention as shown on the accompanying drawings which I have found to work satisfactorily. It is to be understood, however, that this description is for the purpose of illustrating and describing my invention and my invention is not to be limited thereby but is to be defined by the appended claims.

Figure 1:
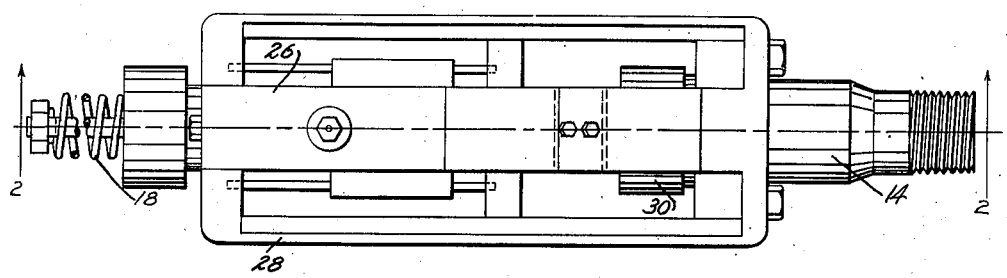
Fig. 1 is a top plan view of one form of pressure modulator provided by my invention.
Figure 2:
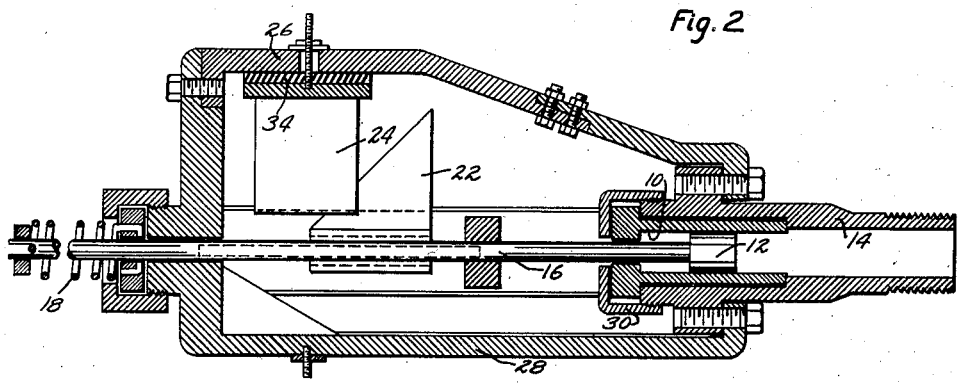
Fig. 2 is a cross-sectional view taken along lines 2—2 of Fig. 1.

Referring to Figs. 1 and 2 showing the pressure modulator, 10 is a cylinder in which a piston 12 it fitted. The cylinder is carried by a threaded member 14 which may be screwed into a convenient opening in the cylinder head. A rod 16 fastened to the piston carries the calibrated spring 18 at its outer end which counterbalances the pressure of the piston. A set of condenser plates 22 is secured to the rod and cooperates with a set of condenser plates 24 mounted on the frame 26 of the pressure modulator. A housing 28 may be used to enclose the mechanism. A removable cylinder wall or liner 10 may be provided and is held in place in the member 14 by nut 30 as shown. As the piston is forced out against the spring by the cylinder pressure, the condenser plates mesh in proportion to the piston travel. As the mesh of the plates increases, it is obvious that the capacity of the condenser is increased. This condenser is connected electrically as shown in Fig. 8. In the type of device shown, the moving plates are grounded. The stationary plates are insulated from the frame 26 by insulation 34.

Referring now to Figs. 3, 4, 5, 6, and 7 which show in detail the crank modulator, a set of fixed plates 36 are secured to an adjustable frame 38. The frame 38 has an annular portion 39 which may be rotatably supported in a supporting member 41 provided with a base flange 43. A spindle 45 of the frame member projects through an opening 47 in the support member. The spindle 45 is provided with threads 49. A locknut 51 operates on the threads to clamp the frame member in the support member. 52 is the modulator crankshaft operating in the spindle 45. A bushing 53 on the crankshaft provided with openings through which a pin 55 extends maintains the crankshaft in proper position. A pair of movable plates 40 are secured to a sliding member 42 which is driven through member 44 from the crankshaft 52. An adjustable connecting rod composed of female member 50, male member 57 and locknut 59 connects the crankshaft with member 44. Member 44 is adjustably secured in groove 46 by nuts 48. The adjustability of the length of the connecting rod and the position of member 44 on the member 42 makes it possible to maintain the same relation between the crank throw and connecting rod length in the modulator as exists in the engine. This makes it possible to obtain an accurate indicator diagram. In many other arrangements for obtaining indicator diagrams electrically, no provision is made for this adjustment; no difference can be noted in the indicator diagram whether the engine stroke be long or short. With the adjustable crank modulator just described, however, the ratio between connecting rod length and crank throw existing in the engine can be preserved in the modulator. The modulator crankshaft 52 is connected by any suitable means as, for instance, a coupling to the engine crankshaft and it can be synchronized with the engine crankshaft by loosening locknut 51 and rotating the frame 38 in the support member 41. A graduated scale 54 secured to or made directly on the support member may be used to indicate the degree of rotation of the supporting frame.

After the modulator crankshaft is synchronized with the engine crankshaft, the yoke is set so that the oscillator controlled by the condenser plates 36 and 40 will work at the reference frequency when the crank is on the bottom or outer dead center.

A flexible lead 56 may connect the movable condenser plates with the terminal connection 53.

Fig. 8 has been divided into blocks to clarify the description and the operation of the device. Blocks A and F enclose the oscillators which are controlled respectively by the pressure and crank modulators. Thus when the pressure in the cylinder increases and the plates 22 mesh with plates 24, the frequency of the oscillator falls. Likewise, movement of the condenser plates 40 into mesh due to crank rotation causes the frequency of the oscillator F to fall. B and E are discriminatory rectifiers, B for the pressure-controlled oscillator and E for the oscillator controlled by the crank position. One of the plates of the 6H6 rectifier of B is connected to a tuned coil L5 while the other plate is connected to a tuned coil L7. The coil L5 and condenser C7 are adjusted to resonate at approximately 300 k. c., while the coil L7 and condenser C9 are tuned to approximately 100 k. c. The rectified output of one side of the tube appears across the resistor R9 while the rectified output of the other side of the tube appears across the resistor R11. The resistors are so connected that when the outputs of each side of the tube are equal, the total voltage between the point 79 at the top of the resistor R9 and ground will be zero. It can thus be seen that when the pressure-controlled condenser is in the open position, the frequency of the oscillator A will be higher than when the condenser is in the meshed position and hence the output of the 300 k. c. side of the rectifier will be greater than that of the 100 k. c. side. This will result in a positive voltage between point 79 and ground. As the condenser moves to the full meshed position, the frequency of the oscillator will decrease until the output of the 100 k. c. side of the rectifier will be the greater. This will result in a negative voltage between point 79 and ground. Since the resistors R9 and R11 are arranged to have their voltages oppose one another, the voltage between the point 79 and ground will be zero, when the output of the oscillator A is approximately 200 k. c., because at that point the output of the rectifier tuned to 300 k. c. will be equal to that of the rectifier tuned to 100 k. c. The voltage appearing between the point 79 and ground is amplified by the amplifier C, the output of which may be connected to the vertical plates of the oscilloscope 906. The normal bias of the amplifier may be adjusted by variable resistor R18 to bring the beam of the oscilloscope to mid-screen when the output of the oscillator A is approximately 200 k. c., with a resultant zero voltage between the point 79 and ground.

The oscillator F and the associated tuned rectifier circuits shown in the block E are similar to the oscillator A and the associated tuned rectifier circuits shown in the block B. The oscillator F, however, is controlled by a crank modulator such as shown in Figs. 3 and 4. The crank modulator may be adjusted to produce an oscillator frequency of 200 k. c., when the piston is at half-stroke. This frequency will, as explained before in connection with oscillator A, bring the voltage between the point 80 and ground to zero.

The voltage appearing between the point 80 and ground is amplified by amplifier D and applied to the horizontal plates of the oscilloscope. The normal bias of the amplifier may be adjusted by means of variable resistor R17 to bring the oscilloscope beam to mid-screen when the voltage between point 80 and ground is zero. Thus the horizontal movement of the oscilloscope beam will indicate the travel of the piston while the vertical movement of the oscilloscope beam will indicate cylinder pressures.

The oscillators are so arranged that their frequencies will never quite reach the point of resonance with the tuned rectifier circuits, since a false reading would be obtained at the point of resonance or beyond.

The amplifiers C and D may be direct resistance-coupled giving a straight-line voltage amplification since little or no power is required to swing the oscilloscope beam.

The values of the various condensers, resistors, and inductances are chosen to give the desired results with the tubes used and are of the types and values well known and used in the art.

Transformer T1, tubes 5V4G, choke CH1, and condensers C18 and C20 form a power supply for the oscillators, amplifiers, and oscilloscope. It is, of course, obvious that while I have chosen 100 and 300 k. c. for the resonance points of the coils and 200 k. c. as a reference frequency, it would be possible to choose other frequencies which would work equally as well. Likewise, it should be understood that there are many circuit constants which can be altered without affecting the manner of operation of the amplifier, oscillator, or modulators. I do, however, show one complete circuit which I have used and found to work satisfactorily. Other types of tubes than those shown may be used if desired.

In order to obtain an indicator diagram the pressure modulator is screwed in a convenient cylinder head opening, the crank modulator is connected to the crankshaft of the engine, and the crank and pressure modulator connected in the electrical circuit. The yoke 50 and connecting rod 44 are then adjusted to synchronize the position of the moving condenser plates with the position of the piston in the cylinder. The pattern produced on the oscilloscope screen by the moving beam will then accurately produce an indicator diagram for the engine under test.

A photographic record may be had by placing a film holder with a suitable film over the oscilloscope tube and making a photograph in the usual manner.

It would, of course, be possible to utilize, instead of the variable condensers in the pressure modulator and crank modulator, a variable inductance which might take the form of a coil sliding within another to vary the coupling therebetween and affect the frequency of an oscillator circuit. The condensers, however, are simpler and can be made with straight line frequency characteristics which recommend their use instead of coils.

It will be noted that this indicating device employs no sliding contacts subject to dirt, wear, or inaccuracies. Likewise, there are no levers or complicated mechanisms to introduce lag or play into the system and distort the readings of the indicator. This indicating device may be used with very high speed internal combustion engines and yet produce accurate results. The electrical or radio circuits employed are of the usual type and are not costly or complicated. Likewise, the oscilloscope is of the type ordinarily employed.

It is to be understood that while I have described one particular embodiment of my invention that various substitutions, omissions, additions, and modifications apparent to those skilled in the art may be made in the embodiment shown without departing from the spirit and scope of the invention as defined by the appended claims.

Likewise, it should be understood that the particular electrical circuit shown is only one of many which may be used and the invention is not to be limited by the one illustrated as it was shown and described for the purpose of clearly describing the invention with one illustrative example.

I claim:

1. An indicator for an engine cylinder comprising an oscillating circuit, means responsive to the pressure within an engine cylinder to vary the frequency of the oscillating circuit, two tuned circuits coupled to the oscillating circuit, one of the tuned circuits tuned to a higher frequency than the other, a rectifier for each tuned circuit, means connected to the rectifiers whereby the rectified outputs of the two tuned circuits oppose each other, and an electrical indicating means controlled by the differential output of the two tuned circuits.

2. An indicator for an engine cylinder comprising two oscillating circuits, means responsive to the pressure within an engine cylinder to vary the frequency of one of said circuits, means related to the position of an engine crankshaft to vary the frequency of the other circuit, two tuned circuits coupled to each oscillating circuit, a rectifier for each of the tuned circuits, the rectified outputs of the tuned circuits of each oscillating circuit being connected to oppose each other, and an electrical indicating means controlled by the combined rectified output of the two tuned circuits associated with each oscillating circuit.

3. An indicator for an engine cylinder comprising two oscillating circuits, means responsive to the pressure within an engine cylinder to vary the frequency of one of said circuits, means related to the position of an engine crankshaft to vary the frequency of the other circuit, two tuned circuits coupled to each oscillating circuit, a rectifier for each tuned circuit, a load resistor energized by the rectified output of each tuned circuit, the load resistors of the two tuned circuits associated with each oscillating circuit being connected to have the voltages appearing across them oppose each other, and an electrical indicating means controlled by the voltages appearing across the two resistors associated with each oscillating circuit.

4. An indicator for an engine cylinder comprising two oscillating circuits, a variable condenser to vary the frequency of one in response to the pressure within an engine cylinder, another variable condenser to vary the frequency of the other oscillating circuit in relation to the position of the engine crankshaft, a visual electrical indicating means, means to move the indicating means in one direction in response to variations in frequency of one of the oscillating circuits and means to move the indicating means in a direction at right angles to said first named direction of movement in response to the variations in frequency of the other oscillating circuit.

5. An indicator for an engine cylinder comprising two oscillating circuits, means responsive to the pressure within an engine cylinder to vary the frequency of one of said circuits, means related to the position of an engine crankshaft to vary the frequency of the other circuit, two tuned circuits coupled to each oscillating circuit, a rectifier for each tuned circuit, a load resistor energized by the rectified output of each tuned circuit, the two load resistors associated with each oscillating circuit being connected to have their voltages oppose each other, and a visual electrical indicator having its movement in one direction controlled by the sum of the opposing voltages across the load resistors associated with one oscillating circuit and its movement in a direction at right angles to the first named direction of movement controlled by the sum of the opposing voltages across the load resistors associated with the other oscillating circuit.

6. An indicator for an engine cylinder comprising two oscillating circuits, means responsive to the pressure within the engine cylinder to vary the frequency of one of said circuits, means related to the position of the engine crankshaft to vary the frequency of the other oscillating circuit, a pair of tuned circuits coupled to each oscillating circuit, a rectifier for each tuned circuit, each pair of tuned circuits being connected to have the rectified output of each tuned circuit of the pair oppose the other tuned circuit of the pair, an amplifier coupled to the combined output of each pair of tuned circuits, an electrical indicating means having its horizontal movement controlled by the output of one amplifier and its vertical movement controlled by the output of the other amplifier, means to set the indicating means to bring its horizontal beam to a reference point when the outputs of the tuned circuits of one of the pairs is equal and means to set the vertical beam at a reference point when the outputs of the tuned circuits of the other pair of tuned circuits are equal.

7. An indicator for an engine comprising two oscillating circuits, a first means to vary the frequency of one in response to the pressure within the engine cylinder, a second means to vary the frequency of the other oscillating circuit, a rectilinearly movable member to actuate said second means, a crank member rotatable with the engine crankshaft, a connecting link between the crank member and the rectilinearly movable member, said connecting link including means to adjust the travel of the rectilinearly movable member with respect to the movement of the rotatable member and an electrical indicating means controlled by the output of said oscillating circuits.

ROBERT H. MORSE, Jr.